United States Patent [19]

Merritt

[11] Patent Number: 5,058,726
[45] Date of Patent: Oct. 22, 1991

[54] TRAY FEED ARRANGEMENT
[75] Inventor: Robert D. Merritt, Rossville, Ill.
[73] Assignee: FMC Corporation, Chicago, Ill.
[21] Appl. No.: 451,221
[22] Filed: Dec. 15, 1989
[51] Int. Cl.⁵ .............................................. B65G 57/00
[52] U.S. Cl. .................................. 198/418.3; 198/408;
        414/795.6; 414/797.7
[58] Field of Search ...................... 198/404, 408, 418.3,
        198/388, 733; 414/795.6, 797.7; 53/250

[56] References Cited

U.S. PATENT DOCUMENTS

| | | | |
|---|---|---|---|
| 2,383,528 | 8/1945 | Winters | 198/404 |
| 3,172,550 | 3/1965 | Caldwell | 198/404 |
| 4,721,199 | 1/1988 | Ioannides | 198/388 |
| 4,867,632 | 9/1989 | Provan et al. | 414/797.7 |

Primary Examiner—Joseph E. Valenza
Attorney, Agent, or Firm—Ronald C. Kamp; R. B. Megley

[57] ABSTRACT

A means for precisely depositing containers into a moving nest, with the means being relatively insensitive to the speed of the nest. Each container is positioned over a lug which is driven at the speed of the moving nest and the container is aligned with the nest. When the container and nest are aligned and at the same speed, the container is dropped into the nest.

2 Claims, 2 Drawing Sheets

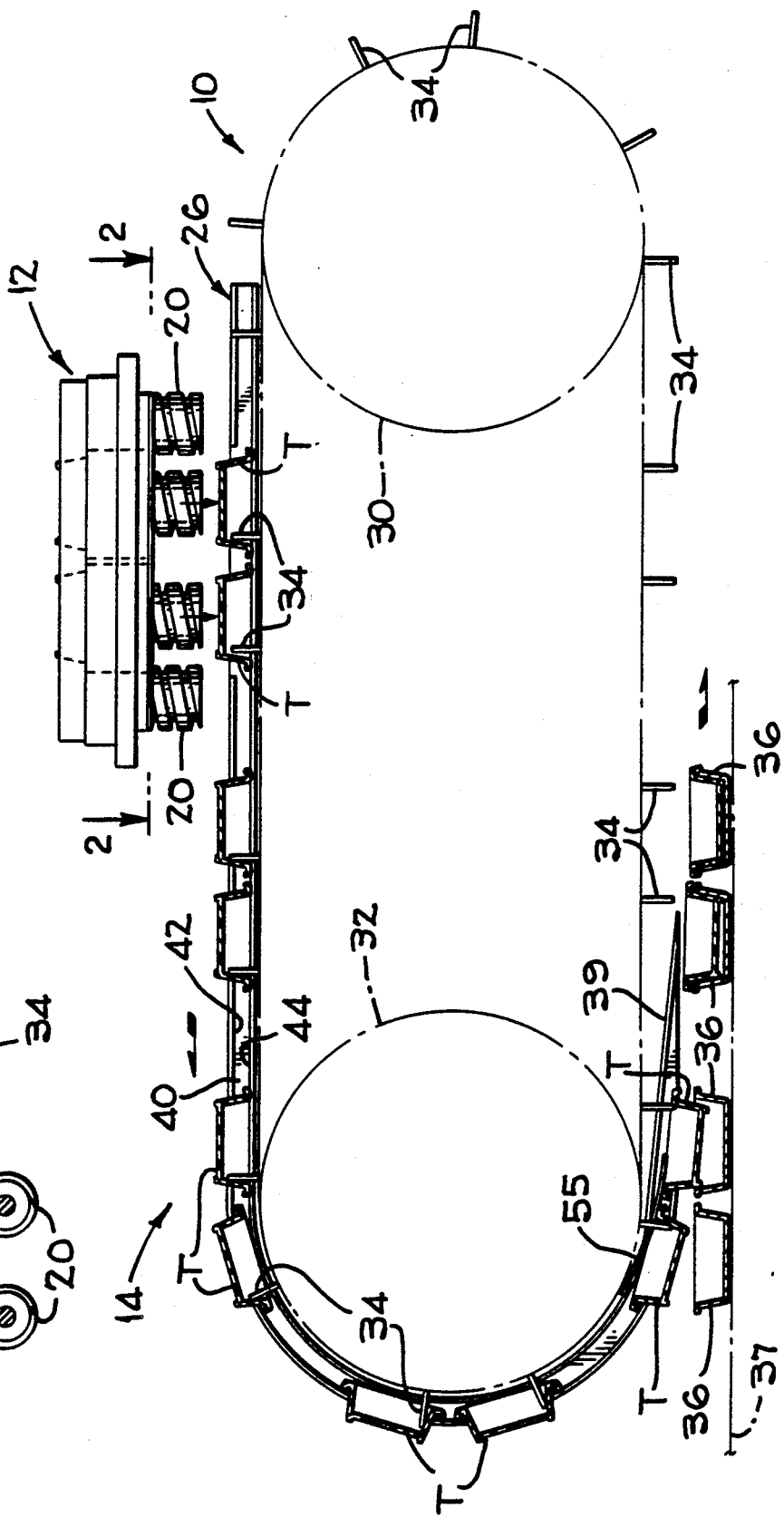

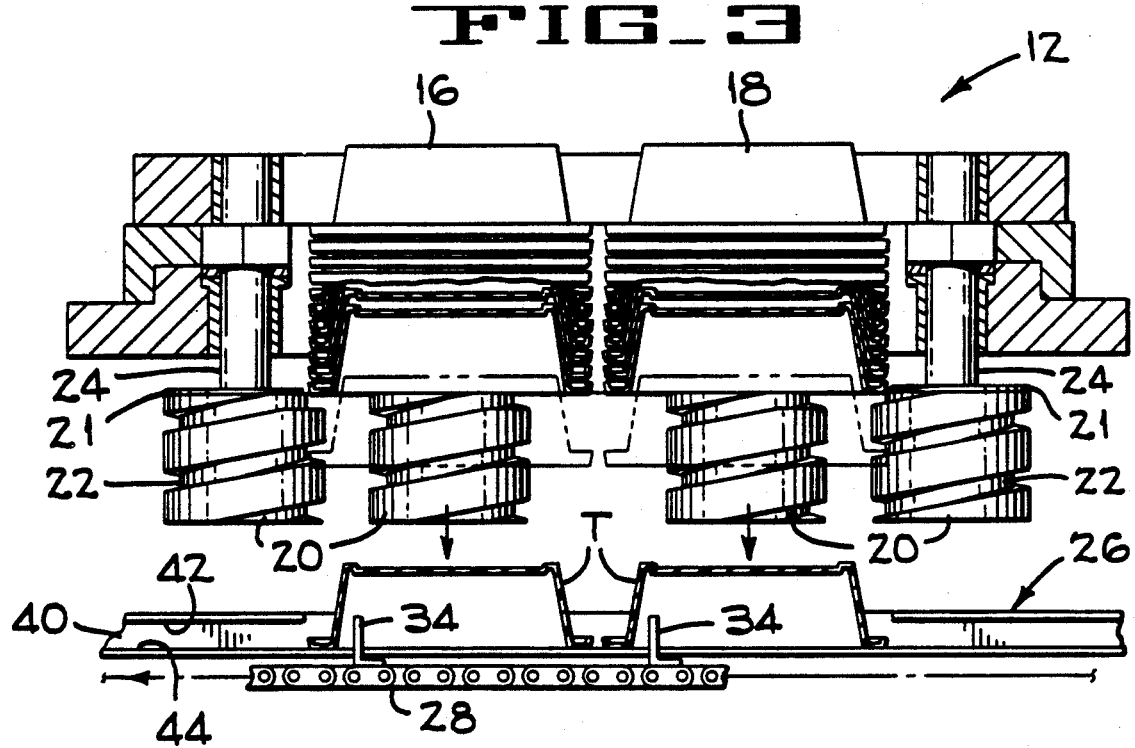
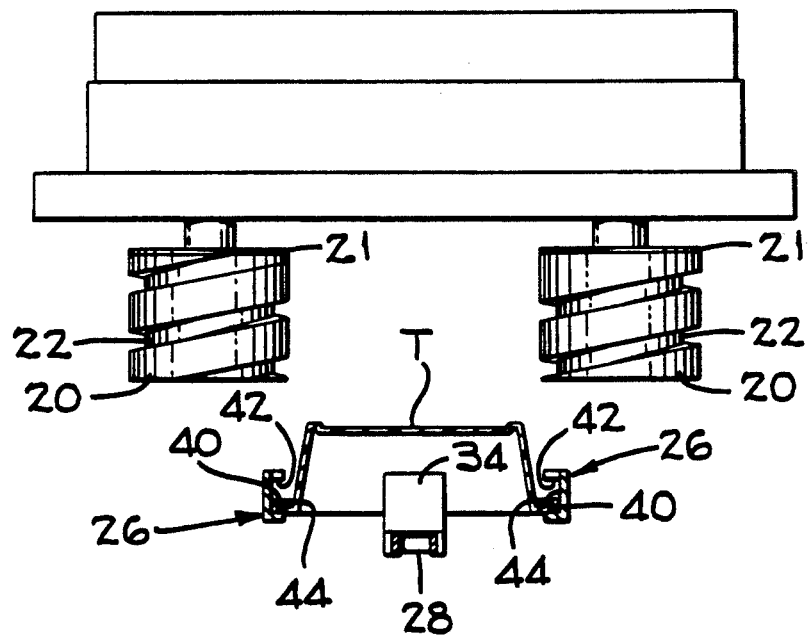

TRAY FEED ARRANGEMENT

This invention relates to deposit-fill-seal systems generally, and more particularly to a means for introducing trays or containers into such systems.

The utilization of barrier plastic trays or containers to package foods has increased for a variety of reasons. One reason is that plastic containers can be safely placed in a microwave oven to cook or warm the contents, whereas metal cans cannot. Since barrier plastic is impervious to gases, most significantly oxygen, packages formed therewith have extended shelf life without the need for refrigeration. systems which form packages of barrier plastic are commonly referred to a deposit-fill-seal or DFS systems. The sealing technology for DFS systems requires the application of compressive pressure between the lid and the lip of the container. Since the tray itself is relatively flexible, support is required to prevent deflection of the container during the sealing operation. The support required for sealing, as well as for other purposes, has typically been provided by placing such tray into a nest which conforms as practically possible to the outer shape of the tray. The nests are mounted on an endless chain which passes around one or more multi-station rotary fillers and finally around a multi-station rotary sealer so that a lid positioned on the tray can be sealed to the lip of the tray. In order to be competitive with other packaging processes, the trays must be filled and sealed at high speeds, which can be at rates as high as 400 per minute. The trays must, of course, be introduced to the system at the same rate which requires extremely accurate timing since the nests are moving at high speed and the containers are, for all practical purposes, stationary.

The present invention provides a means which precisely deposits a tray or container into a moving nest, which is relatively insensitive to the speed of the moving nest, and which is reliable and consistent. These and other attributes of the present invention, and many of the attendant advantages thereof, will become more readily apparent from a perusal of the following description and the accompanying drawings, wherein:

FIG. 1 is an elevational view of a mechanism for depositing trays into the nests of a DFS system;

FIG. 2 is in a cross-section taken on line 2—2 of FIG. 1;

FIG. 3 is a cross-sectional view of the tray feeder; and

FIG. 4 is an end view of the tray feeder showing a tray deposited thereby on the guide rails.

Referring to FIG. 1, there is shown a tray feed mechanism, indicated generally at 10, which includes a tray feeder 12 and a coordinating mechanism 14. The tray feeder 12, as shown in FIG. 4, support a pair of stacks 16 and 18 of barrier plastic trays. The trays are oriented in an inverted or upside-down position and, in the configuration shown, are generally rectangular in plan form. The outwardly projecting lip of the lowermost tray of each stack rests on these cylindrical members 20, as shown in FIGS. 1 and 2. Each cylindrical member 20 has a helical groove 22 of a width and depth capable of engaging the lip of the lowermost tray. A knife 21 is mounted on the top of each cylindrical member and is rotatable therewith. The knifes 21 are positioned to engage the lower surface of the lip on the tray immediately above the lowermost tray just as the lowermost trays drop into the grooves 22, to assure that the lowermost trays are separated from their respective stacks by the grooves 22. The cylindrical members 20 and knives 21 are attached to shafts 24 which are driven in unison by an appropriate conventional drive means, not shown. As the shafts are rotated, the lips of lowermost tray in each stack drop into the grooves 22 and powered downward to be deposited on a pair of guide rails 26 of the coordinating mechanism 14.

The coordinating mechanism 14 includes a chain 28 which is trained over a pair of sprockets 30 and 32, the latter of which is driven. The guide rails 26 are supported above the chain 28 and are spaced apart to engage the lip of the trays and provide support therefor. When the trays are dropped onto the guide rails 26, they have a velocity in a horizontal direction which is zero, while the chain 28 has a velocity in a horizontal which is the same as that of the nests, which are shown at 36 in FIG. 1. The nests rest on and are carried by a chain, indicated by the line 37 in the DFS system. A plurality of lugs 34 are secured to the chain 28 and project above the bottom of the rails 26 and into the interior of the inverted trays. The rotation of the shafts 24 being coordinated with the rotation the sprockets 30 and 32 and the position of the lugs 34 so that the leading side of the trays is ahead of the lugs 34, i.e., to the left of the lugs 34 as shown in FIG. 1. The movement of the chain 28 will bring the lugs 34 into contact with the trays and accelerate the trays to the speed of the chain 28. Friction between the rails 26 and the trays assures that the trays will maintain contact with the lugs 34.

Each of the guide rails 26, as shown in FIGS. 3 and 4, has a vertical side member 40 and outer and inner surfaces 42 and 44. The side members 40 keep the trays centered over the chain 28. The trays rest on the inner surface 44 as they are propelled by the lugs 34 along the upper rim of the chain 28. As the chain 28 passes over the sprocket 32, they are inverted to their upright position and the support for lips of the trays is transferred from the inner surface 44 to the outer surface 42. The position of the lugs 34 are coordinated with that of the nests so that each tray project into the associated nest at approximately the point of discharge of the chain 28 from the sprocket 32; the chain 37 of the DFS system being spaced vertically from the lower run of the chain 28 a sufficient distance to allow such entry. The outer surface 42 terminates approximately a tray length beyond the aforementioned point of discharge and the inner surface 44 angles away from the chain 28, as shown at 39 in FIG. 1, to terminate a short distance vertically above the level of the nests so that each tray will be dropped with the associated nest and urged in to alignment with this nest. Since the speed of the chains 28 and 37 are the same and are moving in the same direction, the trays are releasably and consistently deposited in the nests.

In order to permit the trays to engage the inner surfaces 44 of the guide rails 26 when discharged from the grooves 22, the member forming the outer surface 42 is eliminated in the vicinity below the tray stacks 16 and 18. The outer and inner surfaces 42 and 44 are positioned apart a distance sufficient to prevent binding of the tray lips as the chain 28 moves around the sprocket 32. A retarder is also provided on the rails to prevent the trays T from sliding forward when system is stopped or being run at very slow speed for set-up or adjustment. Any movement of the trays away from engagement with the lugs 34 will result in the trays not properly registering with the nests 36. The retarder compresses a pair of flexible plastic strips, one of which is shown at 55, attached to the guide rails 26 or the support therefor. The strips 55 have a length equal to approximately one and a half times the length of the trays and are attached at a point on the rails in the area of the lower quadrant of the sprocket 32. The strips 55 extend into the path of the trays T and are elastically deformed by the passage of the trays. The deflection of the strips 55 exerts a force on the trays to prevent sliding forward, i.e., to the right as viewed in FIG. 1. This assures that the trays will remain in engagement with the lugs 34 in that area where the trays could otherwise slide forward if the chain 26 were stopped, and thereby assures proper registry of the trays with the nests 36.

It will be appreciated from the foregoing description that the tray feed mechanism of the present invention can reliably and consistently introduce trays into a packaging system and can do so at high speeds. While various modification changes may be made in the form of the invention as shown and described herein without departing from the spirit of the invention as defined by the scope of the appended claims.

What is claimed is:

1. An arrangement for depositing a container into one of a plurality of nest moving at a given speed, comprising:
    an intermediate chain driven at substantially the same speed as said given speed;
    means for depositing a container in an inverted position on said chain;
    a lug attached to said chain and projecting into said container to move said container;
    guide means for directing said container toward an upright position and releasing said container into said nest before said container is in its fully upright position.

2. The invention according to claim 1 and further comprising:
    retarder means for maintaining contact between said lug and said container.

* * * * *